United States Patent [19]

Shank, Jr.

[11] 4,265,947
[45] May 5, 1981

[54] THERMOPLASTIC INK DECORATED, POLYMER COATED GLASS ARTICLES

[75] Inventor: Herbert C. Shank, Jr., Lancaster, Ohio

[73] Assignee: Anchor Hocking Corporation, Lancaster, Ohio

[21] Appl. No.: 775,184

[22] Filed: Mar. 7, 1977

Related U.S. Application Data

[60] Continuation of Ser. No. 573,809, May 2, 1975, abandoned, which is a division of Ser. No. 440,331, Feb. 7, 1974, Pat. No. 3,937,854, which is a continuation-in-part of Ser. No. 378,493, Jul. 12, 1973, Pat. No. 3,937,853.

[51] Int. Cl.$^3$ .............................................. B65D 1/00
[52] U.S. Cl. ............................. 428/35; 215/DIG. 6; 428/210; 428/432; 428/440; 428/442; 428/444
[58] Field of Search ................ 427/29, 185, 265, 195, 427/269, 287, 46, 190, 282; 428/35, 210, 444, 442, 426, 432, 440; 215/1 R, DIG. 6, 12 R, 18 R

[56] References Cited

U.S. PATENT DOCUMENTS

| | | | |
|---|---|---|---|
| 2,681,473 | 6/1954 | Carlson | 252/62.1 P |
| 3,823,032 | 7/1974 | Ukai | 428/35 |
| 3,872,044 | 3/1975 | Hervey | 427/282 |

Primary Examiner—Ronald H. Smith
Assistant Examiner—Janyce A. Bell
Attorney, Agent, or Firm—Wood, Herron & Evans

[57] ABSTRACT

A glass article is decorated with a thermoplastic ink which contains no frit. A finely divided heat fusible polymeric coating material is applied to the article over the ink. The article is heated to a temperature at which the particles of coating material fuse to form a smooth continuous film over the ink while the latter is in melted, semi-liquid condition. The melted ink diffuses into (but not through) the polymer film over it, thereby forming a melt-melt bond. The polymeric film imparts a serviceability to the ink which it would not otherwise display.

6 Claims, 3 Drawing Figures

THERMOPLASTIC INK DECORATED, POLYMER COATED GLASS ARTICLES

This application is a continuation of application Ser. No. 573,809, filed May 2, 1975, now abandoned, which in turn was a division of application Ser. No. 440,331, filed Feb. 7, 1974, now U.S. Pat. No. 3,937,854, which in turn was a continuation-in-part of application Ser. No. 378,493, filed July 12, 1973, now U.S. Pat. No. 3,937,853.

The invention relates to the decoration of glass articles with thermoplastic inks which ordinarily would not be serviceable for such use, and the combining of such inks with a coating by which they are made serviceable.

In the manufacture of glass articles, it is of course often desirable or essential to apply a decoration to the article. (As used herein, the term "decoration" is used broadly to mean, without limitation, trademarks, labels, instructions for use, contents, pictures, designs, or other written or printed material. The decoration may be translucent, transparent, or opaque, and may be of one or more colors including black or white.) Whatever the decoration, it must be serviceable for the normal use of the article; that is to say, the decoration should not smear, abrade, rub off, chip, or be removed by whatever type of rinse or detergent wash the article might be expected to encounter in its ordinary use or in the handling incidental to its manufacture or filling. Thus, the standard decorating compositions used in labeling pop bottles, for example, are formulated to withstand abrasion in filling lines and in use, and to resist the usual washes and so on.

In order to provide such serviceability or durability, it is the most common practice to decorate glass bottles with a frit-containing composition that includes a glassy component which is bonded to the glass surface by firing at high temperature. The fired, enamel-like frit fixes the coloring pigments on the article's surface. Organic inks for glasses are known, which also are united with the glass by firing.

Such compositions or "colors" are most frequently applied by the screen decorating process. For screenability the composition is often made up as a viscous, water-containing slip or, alternatively, as a hot melt or thermoplastic material which is solid at room temperature but becomes a screenable semiliquid paste when heated to a temperature of about 120–200° F. The decorating material, whether water slip or hot melt, is applied to delineated regions of the glass article by being squeegeed through a stencil in the form of a screen of silk or wire which is placed in registry on the surface of the article. When the screen is separated from the article, the decorating material remains on the article in the delineated area and dries by loss of water (if a slip) or quickly solidifies (if a hot melt). At this stage the decorating material is very poorly and impermanently adherent to the glass surface, and is a waxy, chalky or powdery layer which is not serviceable. It will smudge upon contact, and is too easily removable in washing. It becomes durable and serviceable only if heated so that it fuses and unites integrally to the glass.

Thus, in order durably to bond such colors to the glass surface, the screen decorated article has heretofore had to be subjected to a special, high temperature firing step which unites the decoration with the glass surface. Inorganic frit-containing colors must be fired at a temperature above 800° F., and organic colors at temperatures of 350°–500° F. For the inorganic colors this reheating typically requires a cycle of roughly 45-60 minutes duration. For the organics, the firing cycle is shorter, but in either case there is involved a substantial capital expenditure (and very substantial space requirements) for the heating equipment and conveyors. Moreover, there is a substantial operating cost in terms of fuel, article handling and maintenance. However, such firing has been necessary to bond the decoration so as to provide permanence.

The cost of such decorating materials is relatively high, in large part because of the expense of frit or other bonding components and the heat treatment necessary for bonding. This relatively high cost has had the affect of restricting use of such materials to relatively small surface areas or portions of the decorated articles. (Organic colors, which do not require quite such high temperature firing, do not provide the intensity of color or frit bonded colors, and hence are less useful.) Speaking generally, it has not been economically practical to screen decorate a large percent of the decoratable surface area of glass containers, at least on the high volume product. For that reason, frit decorated containers generally do not have large color panels, stripes or designs covering a high percent of their surface area, although from a merchandising standpoint larger color areas would open up new possibilities for enhancing the appeal and visibility of containers.

This invention is directed to a procedure by which color decoration can be applied to much larger glass surface areas than would otherwise be economically feasible. Much lower cost materials can be used, but the prolonged or high temperature firing cycles that have heretofore been necessary are avoided. At the same time, the decoration is fully serviceable, even though it is not united with the glass surface. This is achieved with the utilization of colors which are not bonded durably to the article, and which do not require formulation with the expensive frit or bonding ingredients that have largely been responsible for the relatively high costs of the decorating colors previously used. In general, colors can be used which would not, in the absence of anything more, adequately resist the abrasion, water or alkali attack to which the article is subjected in its ordinary use.

A thermoplastic or hot melt color is used in carrying out the invention and is applied by the screen decorating technique. It solidifies very rapidly, almost instantly, on the cooler ware. The color (sometimes referred to hereinafter as an "ink") is formulated so as to become semi-liquid, with a consistency suitable for screening, upon moderate heating. It may be similar to known hot melt colors, except that it can be and desirably is compounded without the heretofore conventional frit binding ingredients. Such components are not necessary for bonding and, while they are not harmful, they are not necessary.

Hot melt colors or inks are well known per se and usually include as the vehicle a wax or waxlike material having a melting point between about 120° and 200° F. Examples of such waxy vehicle constituents are carnauba wax, paraffin wax, microcrystalline wax, beeswax, palmitic acid, stearic acid, and solid soaps. This is preferably the bulk of the vehicle, e.g., about 60–85% by weight. The vehicle may also include a binder for adhering the ink to the glass. For example, about 5–25% resin or the like is useful as a binder and hardener. Ethyl cellulose may also be present (e.g., 2–15% of the vehicle) as a viscosity promoter and hardening agent.

The pigment or coloring ingredient incorporated with the vehicle may be particulate inorganic material, e.g., $TiO_2$ or $Cr_2O_3$, which is insoluble in the vehicle, or it may be an organic dye, or a mixture of organic and inorganic colorants. It is desirable to omit any volatiles which would have to be removed for solidification to occur and any solvents which would affect the coating resin when the latter is applied. The ink itself does not comprise the invention and its constituents are not critical. From this disclosure those skilled in the art will readily be able to formulate a variety of suitable thermoplastic inks.

The ink sets up rapidly when applied to the surface of ware which is at a temperature below the screening temperature, for example at ambient temperature. Second or multiple colors having successively higher melting points can be sequentially overprinted on the first color, in order to provide a multi-color decoration. None of the layers of ink, however, are permanently boned to the surface of the glass, and the process is characterized by the absence of any baking or firing operation which would unite the decoration to the glass surface as a frit is united. The decoration remains on the glass surface as a waxy deposit, and is easily removable.

A finely divided discrete particle fusible resin is applied over the ink. The article is preferably heated for this purpose so that upon contacting the article, the resin particles will soften or fuse sufficiently to become at least partially adherent to it.

The article is then passed through an oven which does not fire or bake the ink onto it, but which melts both the fusible resin and the ink, causing the resin particles to flow together to form a smooth, continuous film over the ink. At the same time this heating operation causes some diffusion of the ink into the polymeric film. However, it is important that the ink does not migrate entirely through the coating film, to the outside surface. In the final product the ink is protected by a continuous layer of polymeric coating over it, there being a melt-melt type bond between the solidified resin and ink.

It might be expected that the fusion of a particulate resin over a fluid ink would cause undesirable loss of sharpness or blurring of the decoration. Nonetheless, I have found that this does not occur and a high degree of sharpness and distinctness is maintained, and that in fact the melted state of the ink during polymer fusion (and optionally, during polymer laydown) facilitates or improves the bond of the polymer to the ink. In this connection, it is advantageous to apply the ink through a screen which is 200 mesh or finer (U.S. Standard) screen. Ordinarily, for applying glass frit type decorations, 165 mesh screens are used. This results in a relatively thick lay-down of decoration and thus utilizes a greater amount of material per unit decorated area. Use of screens of smaller mesh sizes has been found feasible in this invention, by reason of the omission of particulate frit component. This reduces the cost of materials used and also contributes to maintaining sharpness of definition in the product, in that the relatively thin layer of ink tends to blur less around the edges than a thicker layer when the polymer particles impinge on the ink and are fused over it.

The application of polymeric coatings on glass articles, including carbonated beverage bottles, is known per se. Such coatings are useful to protect the glass surface from surface abrasion which otherwise would inevitably occur in manufacturing, labeling, filling, packing, and/or use. The polymeric coating prevents scratching of the underlying glass, which would reduce its strength. The coating also provides a degree of cushion and thereby softens impact blows which might otherwise cause breakage. Moreover, when applied to a glass container for pressurized beverages, the coating resists scattering of glass fragments if the container is broken.

In the past, polymeric coatings have been applied over decorations which must first be physically united with the glass and bonded in place. That procedure was recently recommended in *Ceramic Industry Magazine*, September, 1973, pp. 34–37. In that technique the decoration is not melted or semi-liquid during fusion of the polymer, and there is no diffusion of the already hardened decoration into the coating such that a zone or layer of mixed decoration and coating is provided between the decoration and the coating.

In accordance with this invention, the coating material which is applied over the ink is a finely divided resin which is fusible at a temperature at which the ink itself is semi-liquid. By the term "fusible" as used herein in reference to the coating, is meant that the coating particles will heat soften so as to flow together or coalesce to form a smooth, continuous film. Preferred for this purpose are the so-called ionomer resins which are ionic copolymers of alpha olefins and alpha, beta-ethylenically unsaturated carboxylic acids, for example of the type described in U.S. Pat. No. 3,264,272. One such ionic copolymer material which is formed from ethylene and methacrylic acid is available commercially from DuPont under their trademark "Surlyn", grade AD 5001. This material in particular has been promoted in the market by reason of its clarity, elasticity and degree of adherence to glass. It begins to fuse (within the above meaning) at about 204° F. It is not a solvent for the ink, and does not have an adverse chemical affect on the ink. Other heat-fusible resins which may be used include without limitation polyethylene, polyvinyl chloride, and ethylene vinyl acetate resins, in powder form. Such resins may also be prepared as sprayable emulsions, for gun application, with an emulsifier and a vehicle. In this case the resin particles are dispersed in the liquid, but fuse together upon heating, at a temperature at which the ink is semi-liquid. The resin may also be prepared as a screenable liquid, for application on a screen decorating machine.

The polymeric coatings can be applied to glass articles by a variety of coating techniques. In the coating technique which is presently preferred, dry fine particle resin is applied by the electrostatic dry powder spray process. The resin particles are electrostatically charged oppositely to the glass article (which acts as a ground) and are projected toward the article by a relatively gentle air current. The attraction of opposite charges draws the charged particles to the article, to which they adhere electrostatically. For this purpose the article is desirably heated to about 150°–360° F., which improves the electrical conductivity of the glass. At such temperatures the adhered resin particles will partially but not thoroughly fuse together. A final higher heating is necessary to completely fuse the particles so that they coalesce to form a smooth, continuous coating which is adherent to the glass surface.

Another useful method for applying the polymeric coating to glass articles is the fluidized bed technique.

The resin is maintained as an aerated or fluidized mass while the article, heated to a temperature sufficient for at least partial fusion of the resin particles, is moved through the bed so that it becomes coated, then is removed and heated at higher temperature to coalesce or set the particles and form a smooth continuous coating.

Still another type of coating process which can be used is the electrostatic fluidized bed process. In that process the resin particles are maintained as a fluidized bed which is electrostatically charged. When the glass article to be coated (which is grounded) is passed through the bed of charged particles, the charge tends to adhere the particles to it. Prior to coating, the glass container is heated for better conductivity to a point at which the ink becomes melted, but the heating is not sufficient to effect complete fusion of the resin particles on the article, and a final heating at higher temperature is used to set the plastic as a continuous smooth coating.

A further description of the invention and its advantages is given in connection with the accompanying drawings, in which.

Figure 1:
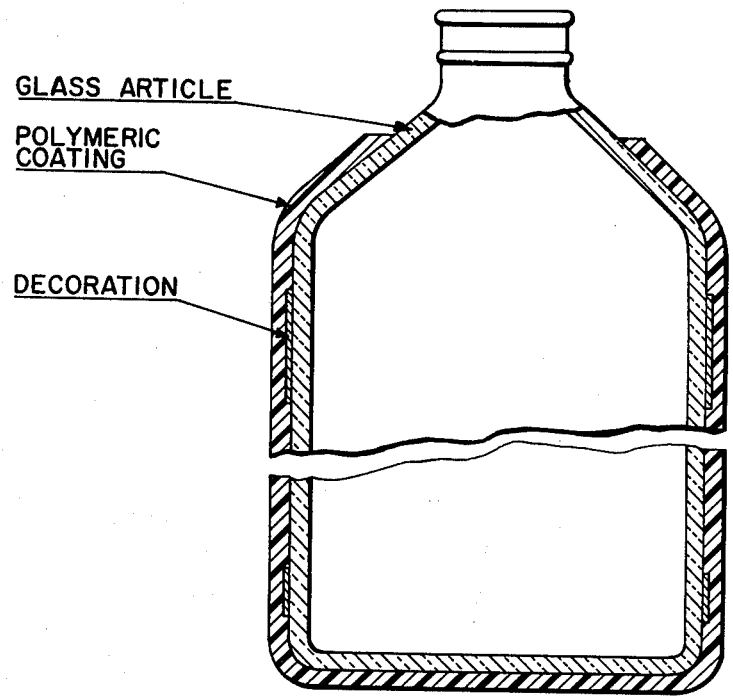
FIG. 1 is an axial section of a narrow neck glass bottle decorated and polymer coated in accordance with the invention, with the relative thicknesses of the ink and the polymer layers greatly exaggerated for purposes of illustration.
Figure 2:
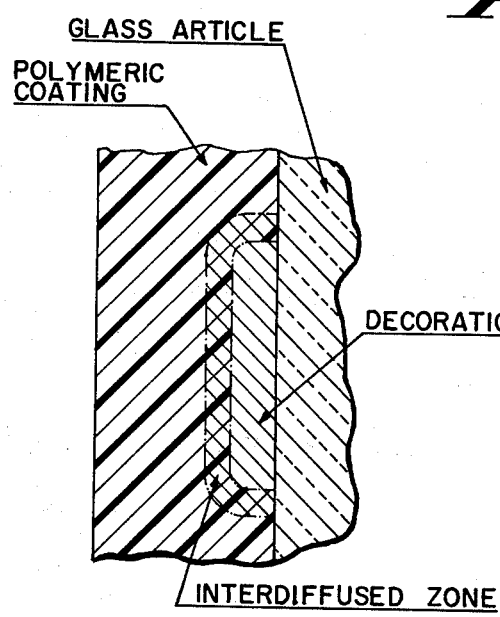
FIG. 2 is an enlarged section showing the zone of interdiffusion of ink and polymer.
Figure 3:
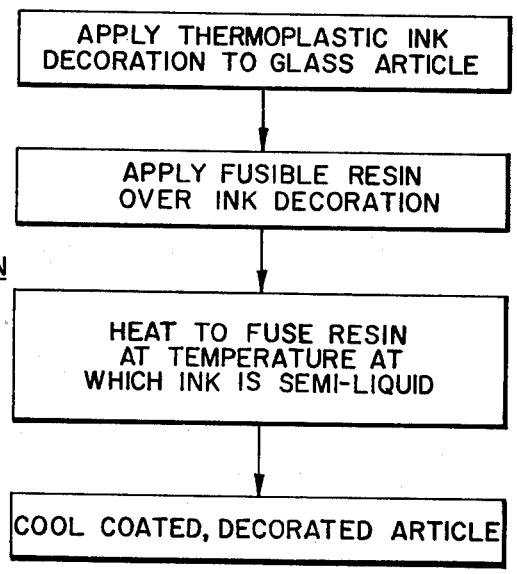
FIG. 3 is a flow diagram illustrating in abbreviated form the steps of carrying out a method in accordance with the invention.

The following examples set forth several alternative techniques for carrying out the invention, but they should not be taken as representing the only specific processes for doing so.

EXAMPLE I

This example constitutes the presently preferred method of carrying out the invention for screen decoration of a conventional soda-lime glass pop bottle and then applying a Surlyn coating. The bottles may optionally have first been given a standard pyrolytic metal oxide ($TiO_2$ or $SnO_2$) coating and olefinic lubricity coating, for example as described in U.S. Pat. No. 3,323,889, but this does not affect the decorating or coating steps.

The decorating color is a non-reactive hot melt or thermoplastic ink. It contains a vehicle which is a wax or waxlike material having a melting point of about 120°–200° F., preferably about 165° F. No volatiles (requiring evaporation for the ink to solidify) are present. An organic or inorganic pigment is mixed with the vehicle. No frit is needed and none is included. The ink would not be serviceable if not protected by the polymeric overcoat, being deficient in adherence and wash resistance. Such inks can be obtained from Drakenfeld Colors, Hercules Incorporated, Washington, Pa., under their designation Hot Organics, and from other sources. They are usually supplied in the form of a solid block which is melted on a heated screen for application, to establish a soft, melted-butterlike consistency for application through the screen.

The decorating color is screened onto the container on a conventional screen decorating machine, for example, as manufactured by Carl Strutz & Co., Mars, Pa.; Applied Color Equipment Co., Sapulpa, Okla.; and Star Equipment Co., Washington, Pa. Depending on the particular silk screening screen printing machine used, the ink may be applied at high rates, e.g., 200 bottles per minute. A further description of hot melt screen decorating is given in U.S. Pat. No. 2,731,912. A 200 mesh to 300 mesh screen is desirable, for minimum ink usage and thickness. The decoration may include a label, trademark, printed information, a design, etc. The squeegeed composition will solidify very rapidly after withdrawal of the screen stencil, on a bottle which is essentially at ambient temperature, e.g., 72° F. The solidified material is a waxy, somewhat chalky layer which is not united to or bonded on the glass and can easily be washed or scratched off. Nonetheless, no fusion, bonding or firing step is used; in fact, the ink would not form any better bond with the glass if it were fired at high temperature. If the ink decorated but uncoated articles are exposed to a standard simulated line tester (such as the American Glass Research Abuse Line Simulator), the ink is so abraded as to be completely unacceptable; similarly, if exposed to a rinse test to simulate the exposure as given by industrial rinsers (such as the Emhart Rinser), the ink fails. The decoration is not serviceable unless and until coated.

A number of different colors of ink can be superimposed in quick succession on the article to produce intricate multicolor designs or decorations, using a multiple color decorating machine.

In accordance with the practice of this invention, the resin is applied directly over the decoration, without bonding reaction or curing of the ink. Preferably, Surlyn resin powder is applied by the electrostatic dry powder spray process. The bottles are carried on a continuous line by chucks which grip them at the finish (i.e., the cap or closure end portion). The bottles are first carried through an oven and preheated to a temperature of about 300°–360° F. (surface temperature as measured by optical pyrometer). Such heating improves the electrical conductivity of the bottles so that they can better act as grounds in the resin coating step, which improves the effectiveness of electrostatic coating step. The resin is sprayed by a conventional dry powder spray apparatus, for example a DeVilbiss Model No. 348, operated at 60 kv DC output. The sprayed, charged particles adhere to the grounded bottles and partially fuse upon contact.

After removal from the spray apparatus, the adherent particulate resin particles are then set by heating to form a smooth continuous film. This is done by passing the bottles through a continuous oven at a temperature of about 390° to 600° F., for a period of 3 minutes to 45 seconds. This melts the ink to a semi-liquid state, however the melted ink does not "ball up" or run, but remains in place on the glass as a semi-liquid as the resin particles fuse over it. In the case of Surlyn, the resin also cures or cross-links as it forms the final hardened coating. The bottles are air cooled to 250°, then quenched by a water rinse to about 200° F. (this prevents hazing of the plastic coating).

In the final product, the decorating color is not united to the glass as a frit-containing ink would be. It adheres to the glass like a wax, and is further protected on the glass by the polymeric film over it, which is bonded to the glass in regions beyond those covered by the decorating color. The polymer coating adds a depth and brilliance to the decoration which an uncoated bottle does not display. The coating is much thinner than the glass wall, and is suitably about 5 mils thick, but this is not critical.

If the polymeric coating is carefully removed by stripping or peeling it from the bottle, it can be seen that an area of ink remains on the bottle as a thin film, while some of the ink is pulled off with the polymer. It has diffused into the polymer, not all the way through the latter, but partially into it. A slanting or wedgelike slice through the film makes apparent the interdiffusion of the ink and polymer. This is believed to improve the bond of the polymer through the ink. The ink is not brittle and retains its thermoplastic character, but the coating protects it so that the ink is not removed or affected by the ordinary use of the bottle.

EXAMPLE II

In this example the polymeric coating is applied to a screen decorated bottle by the electrostatic fluidized bed process.

The screen decoration is applied as in Example I. After the decorating step, the bottles are preheated to about 150°-360° F. (surface temperature as measured by optical pyrometer).

The bottles are then carried through an electrostatically charged fluidized bed of the coating resin particles. The charging apparatus is operated at 30,000 to 90,000 volts DC. After removal from the bed, the adherent particulate resin particles are then set by heating to form a smooth continuous film. The ink is melted and the adherent particulate material is fused over it by passing the bottles through an oven at a peak temperature of 390° F., over a three minute period. The coating is complete after cooling.

If the plastic coating is carefully cut and peeled away from the bottle, again it is found that the decorating color is interdiffused with the polymeric coating. Application of too thick a decoration can cause diffusion through the coating, which is often detrimental to appearance.

EXAMPLE III

It should be understood that the invention is not limited to single color decorations. Where two or more colors are to be applied, they are applied sequentially as hot melts, and set up rapidly. In the subsequent resin fusion step, all of the colors remelt, but they do not mix undesirably or blur during the fusion.

EXAMPLE IV

The coating provides maximum protection for the article if it covers substantially the entire surface of the article excepting the finish portion. However, where protection for the article is not a prime consideration, use of the ink plus coating on even limited areas can provide a full serviceability of the ink, and a degree of protection for the glass surface, with minimal cost increase. For example, the coating may be applied only to a limited area, so as just to cover the decoration and a small adjacent glass surface area. For this purpose, it is advantageous to use a polymeric coating composition which itself is screenable, so that it can be screened on over the coating, preferably on the same decorating machine as that used to apply the ink. This has the advantage of eliminating need for separate coating-applying spray or fluidized bed, or the like. The coating is heated until fused over the ink.

While the foregoing examples illustrate various details of embodiments of the invention in order that others may practice the same, it will be understood that the invention is not limited to utilization of these specific techniques set forth therein, but may be carried out in accordance with other techniques within the scope of the following claims.

I claim:

1. A permanently decorated, polymer coated hollow glass container,
   said container having a surface area thereof with at least one screen print decoration on it,
   said decoration being a thermoplastic hot melt ink which is solid at room temperature and which becomes semiliquid upon heating,
   a polymer film coating on said container which overlies said decoration and which covers regions of said container adjacent to the said surface area on which the decoration is applied,
   an interdiffused zone of said decoration and said polymer coating lying between the decoration and the coating,
   said decoration having an adherence to the glass which is sufficient, in the absence of such polymer coating, to permit such coating to be applied over the decoration without smearing the latter, the adherence of the decoration to the glass being insufficient, in the absence of said polymer coating, to resist removal by such abrasion and alkali attack as is incidental to the ordinary use of the container,
   said polymer coating being a smooth, continuous film of a resin which is anchored to and supported by the glass surface regions with which it is in contact,
   the said decoration being meltable at a temperature below that at which the said polymer coating is fusible,
   the said decoration being melt-on-melt bonded with and diffused into the polymer coating in said interdiffused zone such that the decoration would be at least partially removed with the polymer coating if the latter were peeled away from the container,
   the coating over the surface area of said container which is covered by said decoration being adhered to the glass surface through its bond to the said decoration,
   said decoration being captured by and between the film coating and the glass surface.

2. The container of claim 1 wherein said decoration includes a waxy thermoplastic vehicle and a pigment, said decoration containing no glass frit ingredient.

3. The container of claim 1 wherein said decoration melts at a temperature between 120° and 200° F.

4. The container of claim 1 wherein said resin is a polymeric material which is fusible at a temperature higher than the melting temperature of said decoration.

5. The container of claim 1 wherein said decoration is diffused into said film, but not to the outer surface thereof.

6. The container of claim 1 wherein said decoration is meltable on said container if said film is stripped away from it.

* * * * *